United States Patent [19]

Urushibata

[11] Patent Number: 5,787,619
[45] Date of Patent: Aug. 4, 1998

[54] MAGNETIC DISPLAY ERASING APPARATUS

[75] Inventor: Kiyoshi Urushibata, Shizuoka, Japan

[73] Assignee: Star Micronics Co., Ltd., Shizuoka, Japan

[21] Appl. No.: 733,781

[22] Filed: Oct. 18, 1996

[30] Foreign Application Priority Data

Oct. 18, 1995 [JP] Japan .................................. 7-270263

[51] Int. Cl.$^6$ ....................................................... G09F 9/00
[52] U.S. Cl. ............................................... 40/449; 235/493
[58] Field of Search .............................. 235/493; 40/449; 361/267; 340/788

[56] References Cited

U.S. PATENT DOCUMENTS

| 4,157,581 | 6/1979 | Keiichi et al. | 361/267 |
| 4,675,476 | 6/1987 | Kobayashi | 40/449 |
| 5,359,183 | 10/1994 | Skodlar | 40/449 |

FOREIGN PATENT DOCUMENTS

| 54-29895 | 9/1979 | Japan . |
| 6-168369 | 6/1994 | Japan . |

*Primary Examiner*—Harold Pitts
*Attorney, Agent, or Firm*—Wenderoth, Lind & Ponack, L.L.P.

[57] ABSTRACT

A magnetic display erasing apparatus is provided wherein the distance by which an erasing head is moved when an unerasing operation is to be performed can be made as short as possible, thereby allowing the apparatus to be miniaturized and various designs obtained. A magnetic stripe an a magnetic display sheet are formed on a magnetic card. An erasing head is disposed on the side of the back face of the magnetic card which is conveyed. During an erasing operation, a magnetic field which is substantially parallel is formed at the position where the magnetic display sheet passes. When the magnetic display sheet is not to be erased, the erasing head is retracted from a card conveying path and then housed in a magnetic shield so as to be hermetically sealed. Accordingly, the magnetic field from the erasing head is weakened and cannot reach the magnetic display sheet.

18 Claims, 7 Drawing Sheets

MAGNETIC DISPLAY ERASING APPARATUS

BACKGROUND OF THE INVENTION

1. Field of the Invention

The present invention relates to a magnetic display erasing apparatus for a medium such as a magnetic card, having a magnetic display portion for displaying visible information by the action of a magnetic field.

2. Description of the Prior Art

Conventionally, magnetic cards in which magnetic stripes elongate along the longitudinal direction thereof are widely used in various fields such as bank cards, credit cards, and ID cards. In such a magnetic stripe is recorded, for example, an identification code of a user of the card, as patterns of orientations or strengths of magnetization.

However, since data recorded in such a magnetic stripe are invisible information, a special apparatus such as a card reader is necessary when the recorded data are to be directly checked.

A magnetic card of another type is known in which a magnetic display sheet which contains a micro capsule sensitive-to a magnetic field is formed at a position other than the position of a magnetic stripe (for example, Japanese Unexamined Patent Publication JP-A 6-168369 (1994)). In such a micro capsule, flat magnetic sensitive flakes are encapsulated together with a liquid. When a magnetic field parallel to the card substrate is applied to the micro capsule, the magnetic sensitive flakes are oriented in parallel, so that the optical reflectivity is increased with the result that the magnetic display sheet becomes bright. On the other hand, when a magnetic field vertical to the card substrate is applied to the micro capsule, the magnetic sensitive flakes are vertically oriented, so that the optical reflectivity is reduced with the result that the magnetic display sheet becomes dark. In this way, the magnetic display sheet can display visible information such as characters and symbols in accordance with the applied magnetic field. Consequently, the magnetic card is remarkably improved in ease of use.

First, a writing operation will be described. A recording head for writing is so constructed that a number of cores, on each of which a coil is wound, are arranged at regular pitches. When the magnetic card is conveyed and the magnetic display sheet is brought close to the recording head, the coils of the recording head are selectively energized in accordance with an external signal.

Then, a beam-like magnetic flux is produced from the front end of each core and spot-like vertical magnetic fields are applied to the magnetic display sheet. Upon inspection of the magnetic display sheet, it will be seen that the portions to which the vertical magnetic field is applied are dark and those to which the vertical magnetic field is not applied remain bright. Thus, by conducting a magnetic printing by means of combinations of dots as described above, characters, symbols, and the like can be printed In a visible manner.

Next, an erasing operation will be described. In an erasing head, for example, permanent magnets are arranged so that both the N- and S-poles face the card, thereby producing magnetic fields parallel to the card substrate. The magnetic card is conveyed by a conveyor or the like so as to be moved in the proximity of the erasing head. The magnetic fields produced by the permanent magnets constitute a magnetic field parallel to the magnetic display sheet. Therefore, the magnetic sensitive flakes in the micro capsules are laterally directed, so that the whole of the magnetic display sheet becomes bright and the information is erased.

In a magnetic card in which a magnetic display sheet and a magnetic recording portion such as a magnetic stripe are formed, there is a case where invisible information of the magnetic recording portion is read out or rewritten while preserving visible information of the magnetic display sheet as they are. In another case where new visible information is to be added to the visible information of the magnetic display sheet, the operation of adding the new visible information must be performed in a manner that the existing visible information is not erased. Therefore, in the magnetic display erasing apparatus having the erasing head in which the permanent magnets continually producing an erasing magnetic field are arranged, since the erasing operation is always performed, such a mechanism or the like is required which allows the unerasing operation to be selectively performed. For example, the apparatus of Japanese Unexamined Patent Publication JP-A 6-168369 (1994) has a configuration in which an arm supporting the erasing head is vertically movable so that the erasing head is downward retracted from the card conveying path, whereby the magnetic display sheet is prevented from being affected by the erasing magnetic field of the erasing head.

In the case where the retracting distance of the erasing head is not sufficiently long, however, there arises a possibility that the magnetic display sheet is partly erased or erroneous characters are written into the magnetic display sheet. In order to ensure the reliability, therefore, it is required to provide the erasing head with a sufficiently long retracting distance. This makes it difficult to achieve the miniaturization of the whole of the apparatus. When a magnetic card having both a magnetic stripe and a magnetic display sheet is to be handled, moreover, the apparatus must be configured so that the operation of retracting the erasing head does not adversely affect the magnetic stripe also. This imposes further restrictions on the design of such an apparatus.

SUMMARY OF THE INVENTION

It is an object of the invention to provide a magnetic display erasing apparatus wherein the distance by which an erasing head is moved when an unerasing operation is to be performed can be made as short as possible, thereby allowing the apparatus to be miniaturized and designs to be obtain.

The invention provides a magnetic display erasing apparatus comprising an erasing head which produces a magnetic field and erases visible information written into a magnetic display medium which is conveyed relatively with respect to the erasing head, by an action of the magnetic field, the magnetic display erasing apparatus further comprising:

a magnetic shield for weakening the magnetic field produced by the erasing head during an unerasing operation to an extent that display contents of the magnetic display medium are not affected by the magnetic field.

According to the invention, when an non-erasing operation is selected, the erasing magnetic field of the erasing head is weakened by the magnetic shield to an extent that the magnetic field does not affect visible information of a magnetic display portion. Therefore, it is not required to reserve a long moving distance of the erasing head. Consequently, the apparatus can be miniaturized and restrictions on the design are relaxed.

In the invention it is preferable that the magnetic shield can house the erasing head.

According to the invention, when the erasing head is housed in the magnetic shield, the erasing magnetic field of the erasing head is surely weakened. Therefore, it is not required to reserve a long moving distance of the erasing head. Consequently, the apparatus can be miniaturized and restrictions on the design are relaxed.

In the invention it is preferable that the apparatus further comprises moving means for moving at least one of the erasing head and the magnetic shield.

According to the invention, one or both of the erasing head and the magnetic shield can be moved, and hence the erasing magnetic field can be weakened by a small-sized and simple mechanism.

In the invention it is preferable that a part or the whole of the magnetic shield is attached to the erasing head.

According to the invention, a part of the erasing magnetic field produced by the erasing head can be weakened during an erasing operation also, the erasing magnetic field part being irrelevant to the erasure of the magnetic display portion. During an non-erasing operation, furthermore, the erasing magnetic field can be weakened by the magnetic shielding means attached to the erasing head. Consequently, the erasing apparatus can be realized by a small-sized and simple mechanism.

In the invention it is preferable that the erasing head comprises a portion which produces the magnetic field and another portion where the magnetic shield is disposed, and one of the portions selectively opposes the magnetic display medium by inversion or movement of the erasing head.

According to the invention, the space required for moving the erasing head can be made very small, and hence the erasing magnetic field can be weakened by a small-sized and simple mechanism.

In the invention it is preferable that the movement direction of the erasing head or magnetic shield is parallel to a magnetic display medium conveying plane.

Further, the invention provides a magnetic display erasing apparatus comprising an erasing head which produces a magnetic field and erases visible information written into a magnetic display medium which is conveyed relatively with respect to the erasing head, by an action of the magnetic field, wherein the erasing head is retracted in the direction parallel to the magnetic display medium conveying plane.

According to the invention, by setting a movement direction of the erasing head or magnetic shield to the direction parallel to the magnetic display medium conveying plane, the apparatus can be down-sized in thickness.

As described above in detail, according to the invention, the magnetic field can be weakened by using the magnetic shield to an extent that display information of the magnetic display portion is not affected by the magnetic field, whereby the action of the erasing head can be sufficiently eliminated. Therefore, it is not required to reserve a large moving mechanism for the erasing head and the like. Consequently, the apparatus can be miniaturized and restrictions on the design are relaxed.

BRIEF DESCRIPTION OF THE DRAWINGS

Other and further objects, features, and advantages of the invention will be more explicit from the following detailed description taken with reference to the drawings wherein:

FIGS. 4A to 4C show a fourth embodiment of the invention;

FIGS. 7A to 7C show a seventh embodiment of the invention;

DESCRIPTION OF THE PREFERRED EMBODIMENTS

Now referring to the drawings, preferred embodiments of the invention are described below.

Figure 1A:
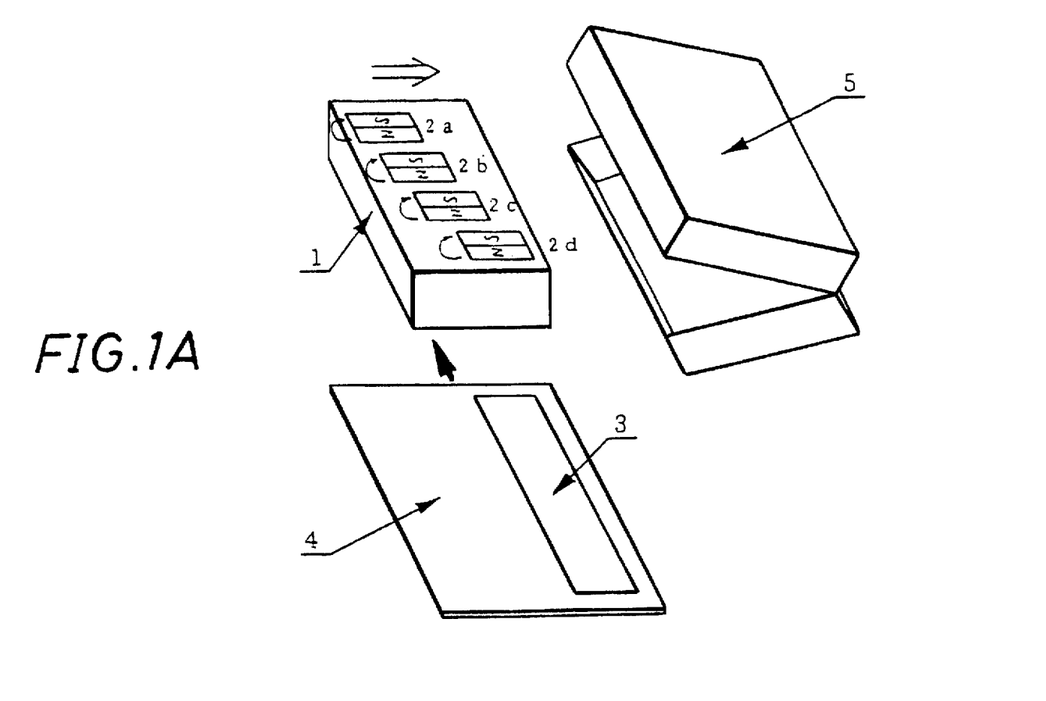
FIG. 1A is a perspective view showing a first embodiment of the invention.
Figure 1B:
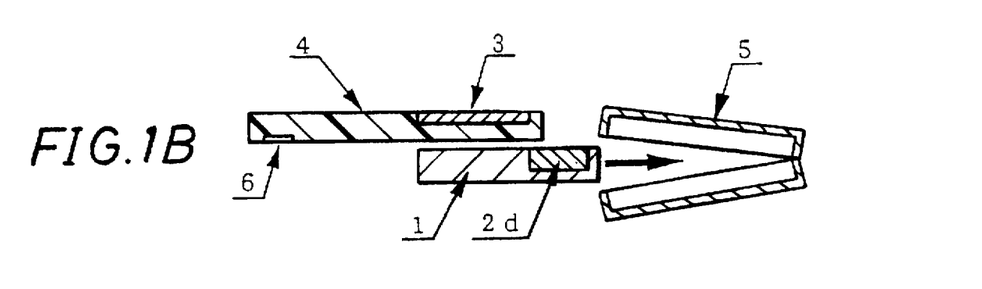
FIG. 1B is a sectional view of the first embodiment.
Figure 1C:
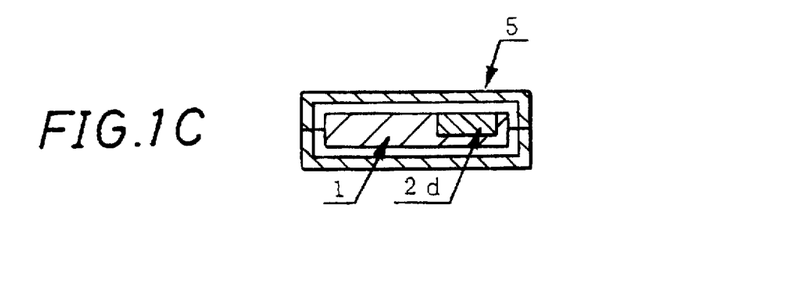
FIG. 1C is a sectional view showing a state where an erasing head is housed.

FIG. 1A is a perspective view showing a first embodiment of the invention, FIG. 1B is a sectional view of the embodiment, and FIG. 1C is a sectional view showing a state where an erasing head is housed.

A magnetic card 4 comprises a rectangular substrate which is made of plastic or the like. A magnetic stripe 6 is formed on the back face of the substrate and in the vicinity of a long side. The magnetic stripe 6 is elongated in the longitudinal direction. A magnetic display sheet 3 is formed on the upper face of the substrate so as to be arranged from the longitudinal center thereof to the side opposite to the magnetic stripe 6.

An erasing head 1 is disposed to the side of the back face of the magnetic card 4 which is conveyed. A plurality of, for example, four permanent magnets 2a to 2d are arranged on the surface of the erasing head 1. The N- and S-poles of the permanent magnets 2a to 2d are oriented in the card conveying direction. The permanent magnets 2a to 2d are positioned slightly shifted in a sequential manner in the width direction of the magnetic display sheet 3. According to this arrangement, a magnetic field directed from the N-pole to the S-pole is produced for each of the permanent magnets 2a to 2d, and erasing magnetic fields which are substantially parallel to each other are formed at a position where the magnetic display sheet 3 passes through the erasing head 1.

First, the operation of erasing the magnetic display sheet 3 will be described. When the magnetic card 4 is conveyed by a belt conveyor or the like so as to be moved in the proximity of the erasing head 1, the magnetic display sheet 3 passes through the parallel magnetic fields produced by the permanent magnets 2a to 2d. As a result, magnetic sensitive flakes in the micro capsules contained in the magnetic display sheet 3 are magnetized and laterally directed, so that the whole of the magnetic display sheet 3 becomes bright, and the erasing operation is thus completed.

Next, the case where the magnetic display sheet 3 is not to be erased will be described. The erasing head 1 is moved in a direction parallel to the card conveying plane by a moving mechanism which is not shown, so as to be retracted from the conveying path. A box-like magnetic shield 5 which is openable is disposed at the side of the card conveying path. As shown in FIG. 1C, the erasing head 1 is housed in the magnetic shield 5 so as to be hermetically sealed. The magnetic shield 5 is made of a high-permeability ferromagnetic substance such as Fe, Ni, Co, or an alloy of these metals; Permalloy (trade name); or silicon steel so that leakage fluxes from the erasing head 1 are interrupted and hardly escape to the outside. Accordingly, the magnetic field from the erasing head 1 is weakened and cannot reach the magnetic display sheet 3.

The disposition of the magnetic shield 5 in the vicinity of the conveying path can shorten the moving distance of the erasing head 1, thereby allowing the whole of the apparatus to be miniaturized. In the prior art, for the magnetic card 4 having both the magnetic display sheet 3 and the magnetic stripe 6, the retracting position of the erasing head 1 must be determined in consideration of the effect on the magnetic stripe 6 also. The use of the magnetic shield 5 can eliminate such restriction. For example, the erasing head 1 can be retracted toward the magnetic stripe 6.

In the above, the example in which the erasing head 1 is moved has been described. Alternatively, the magnetic shield 5 may be moved, or both the erasing head 1 and the magnetic shield 5 are moved and then the former may be housed in the latter.

Figure 2:
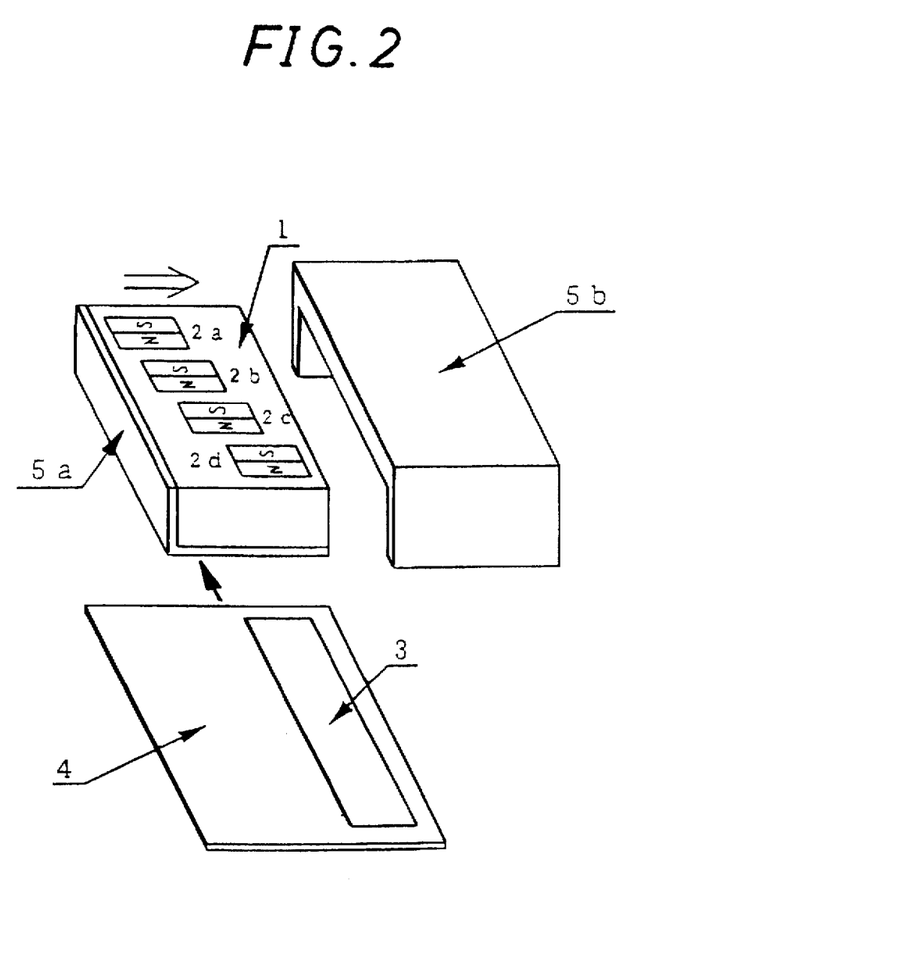
FIG. 2 is a perspective view showing a second embodiment of the invention.

FIG. 2 is a perspective view showing a second embodiment of the invention. The magnetic card 4 and the erasing head 1 are configured in the same manner as those shown in FIG. 1 and hence duplication of description is omitted. In FIG. 2, magnetic shields 5a and 5b can be separated from each other. The one magnetic shield 5a is attached by an adhesive to the bottom face and one side face of the rectangular parallelopiped erasing head 1. The other magnetic shield 5b is configured so that, when the magnetic shield 5a is inserted, the shields form a box-like shape.

The operation of erasing the magnetic display sheet 3 is performed in the same manner as described above. Namely, when the magnetic card 4 is moved in the proximity of the erasing head 1, the visible information recorded on the magnetic display sheet 3 is erased by the parallel magnetic field produced by the permanent magnets 2a to 2d.

Next, the case where the magnetic display sheet 3 is not to be erased will be described. The erasing head 1 is moved in a direction parallel to the card conveying plane by a moving mechanism which is not shown, so as to be retracted from the conveying path. When the erasing head 1 is housed in the magnetic shield 5b, the magnetic shields 5a and 5b are magnetically Joined together so as to form one shield structure. As a result, leakage fluxes from the erasing head 1 are interrupted and hardly escape to the outside. Accordingly, the magnetic field from the erasing head 1 is weakened and cannot reach the magnetic display sheet 3.

Consequently, the moving distance of the erasing head 1 can be set to be short, with the result that the apparatus can be miniaturized and the degree of freedom of the design is increased.

The number of the separated magnetic shields is not limited to two and may be three or more. A configuration in which one or both of the magnetic shields 5a and 5b are moved may be employed.

Figure 3:
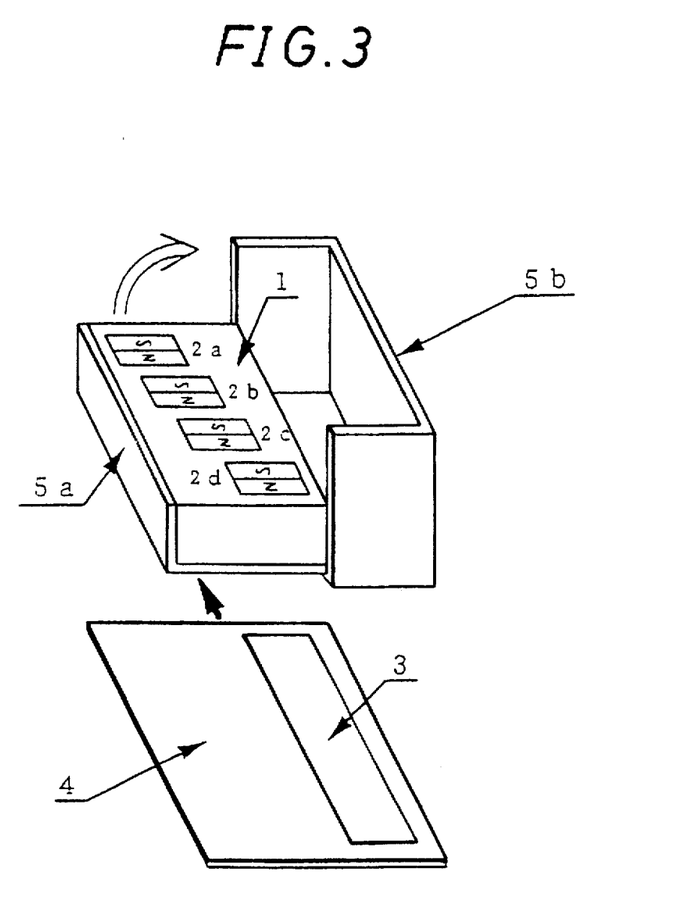
FIG. 3 is a perspective view showing a third embodiment of the invention.

FIG. 3 is a perspective view showing a third embodiment of the invention. The magnetic card 4 and the erasing head 1 are configured in the same manner as those shown in FIG. 1 and hence duplication of description is omitted. In FIG. 3, the magnetic shields 5a and 5b are rotatably supported so as to be openable. The one magnetic shield 5a is attached by an adhesive to the bottom face and one side face of the rectangular parallelopiped erasing head 1. The other magnetic shield 5b is configured in such a manner that, when the magnetic shield 5a is closed, the shields form a box-like shape.

The operation of erasing the magnetic display sheet 3 is performed in the same manner as described above. Namely, when the magnetic card 4 is moved in the proximity of the erasing head 1, the visible information recorded on the magnetic display sheet 3 is erased by the parallel magnetic fields produced by the permanent magnets 2a to 2d.

Next, the case where the magnetic display sheet 3 is not to be erased will be described. The erasing head 1 is caused to be angularly displaced in the direction of the arrow by a moving mechanism which is not shown, so as to be retracted from the conveying path. When the erasing head 1 is housed in the magnetic shield 5b, the magnetic shields 5a and 5b are magnetically Joined together so as to form one shield structure. As a result, leakage fluxes from the erasing head 1 are interrupted and hardly escape to the outside. Accordingly, the magnetic field from the erasing head 1 is weakened and cannot reach the magnetic display sheet 3.

Consequently, the moving distance of the erasing head 1 can be set to be short, with the result that the apparatus can be miniaturized and restrictions on the design are relaxed.

The number of the separated magnetic shields is not limited to two and may be three or more. A configuration in which one or both of the magnetic shields 5a and 5b are moved may be employed.

Figure 4A:
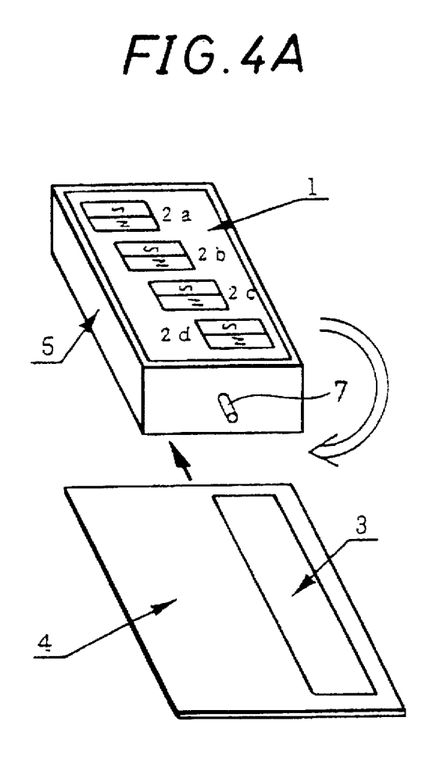
FIG. 4A is a perspective view showing an erasing state.
Figure 4B:
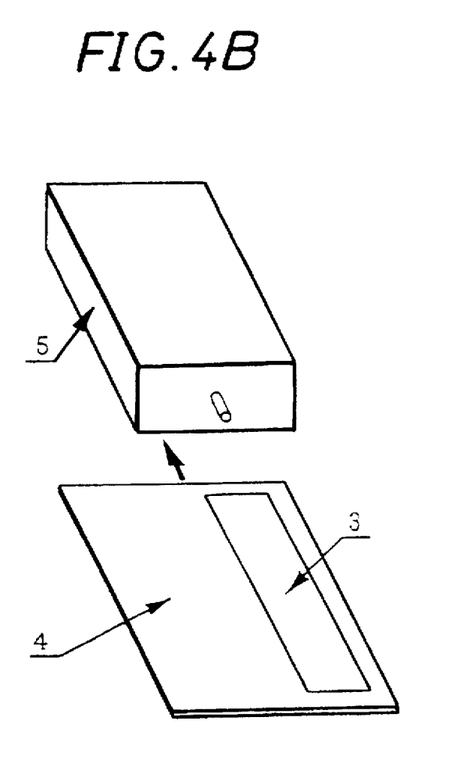
FIG. 4B is a perspective view showing an unerasing state.
Figure 4C:
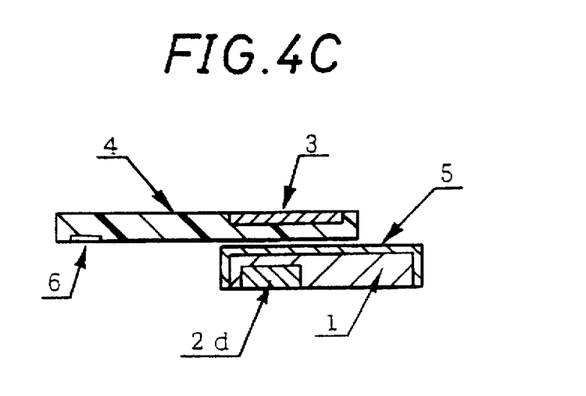
FIG. 4C is a sectional view of FIG. 4B.

FIGS. 4A to 4C show a fourth embodiment of the invention. FIG. 4A is a perspective view showing an erasing state, FIG. 4B is a perspective view showing an unerasing state, and FIG. 4C is a sectional view of FIG. 4B. The magnetic card 4 and the erasing head 1 are configured in the same manner as those shown in FIG. 1 and hence duplication of description is omitted.

In FIG. 4, the erasing head 1 is formed so as to have a rectangular parallelopiped shape. The magnetic shield 5 is attached to the bottom face and four side faces of the erasing head. The erasing head 1 is disposed on the side of the back face of the card conveying path, and supported by a rotating mechanism which is not shown, in such a manner that the erasing head 1 can be rotated 180 degrees about a shaft 7.

When the magnetic display sheet 3 is to be erased, the erasing head 1 is positioned so that the erasing face thereof opposes the card convey path. In the same manner as described above, when the magnetic card 4 is moved in the proximity of the erasing head 1, the visible information recorded on the magnetic display sheet 3 is erased by the parallel magnetic fields produced by the permanent magnets 2a to 2d.

Next, the case where the magnetic display sheet 3 is not to be erased will be described. The erasing head 1 is turned over and then positioned so that the bottom face of the erasing head 1 opposes the card conveying path, thereby attaining a posture in which the erasing face is most remote from the conveying path. As a result, magnetic force emitted from the erasing face cannot reach the conveying path. Particularly, the existence of the magnetic shield 5 largely attenuates the magnetic field to a degree at which the magnetic field at the position where the magnetic display sheet 3 passes does not produce a problem from a practical view point.

Consequently, the moving distance of the erasing head 1 can be set to be short, with the result that the apparatus can be miniaturized and the degree of freedom of the design is increased.

Figure 5:
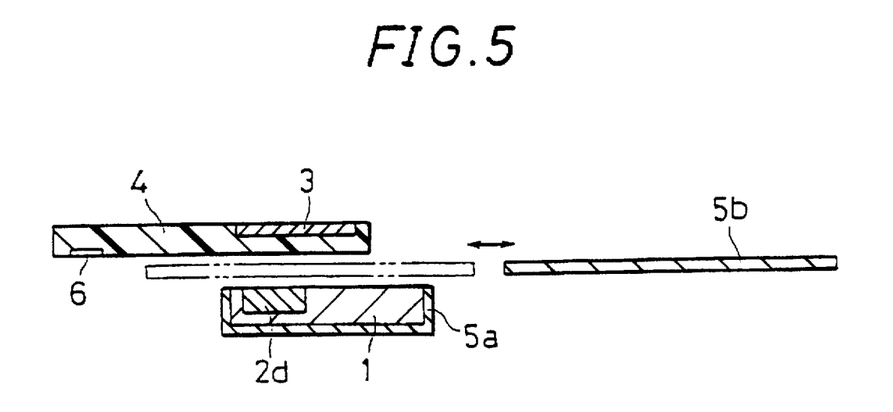
FIG. 5 is a sectional view showing a fifth embodiment of the invention.

FIG. 5 is a sectional view showing a fifth embodiment of the invention. The magnetic card 4 and the erasing head 1 are configured in the same manner as those shown in FIG. 1 and hence duplication of description is omitted. In FIG. 5, the erasing head 1 is formed so as to have a rectangular parallelopiped shape. The magnetic shield 5a is attached to the bottom face and four side faces of the erasing head 1.

The erasing head 1 is disposed to the side of the back face of the card convey path in such a manner that the flat magnetic shield 5b can be inserted between the erasing head 1 and the card conveying path.

The case where the magnetic display sheet 3 is to be erased will be described. When the magnetic card 4 is moved in the proximity of the erasing head 1, the visible information recorded on the magnetic display sheet 3 is erased by the parallel magnetic fields produced by the permanent magnets 2a to 2d.

Next, the case where the magnetic display sheet 3 is not to be erased will be described. The magnetic shield 5b is moved by a moving mechanism which is not shown, so as to cover the erasing face of the erasing head 1. Under this state, the magnetic shields 5a and 5b are magnetically joined together, thereby interrupting the magnetic field extending from the erasing face of the erasing head 1. As a result, the magnetic field is largely attenuated to a degree at which the magnetic field at the position where the magnetic display sheet 3 passes does not produce a problem from a practical view point.

Consequently, such moving structure of the magnetic shield 5b allows the apparatus to be miniaturized and the degree of freedom of the design to be increased.

Figure 6:
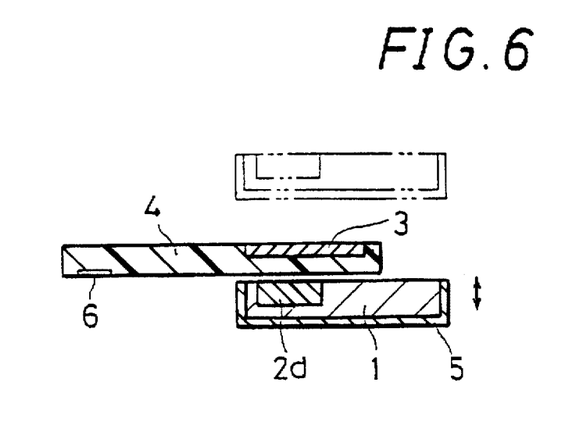
FIG. 6 is a sectional view showing a sixth embodiment of the invention.

FIG. 6 is a sectional view showing a sixth embodiment of the invention. The magnetic card 4 and the erasing head 1 are configured in the same manner as those shown in FIG. 1 and hence duplication of description is omitted.

In FIG. 6, the erasing head 1 is formed so as to have a rectangular parallelopiped shape. The magnetic shield 5 is attached to the bottom face and four side faces of the erasing head 1. The erasing head 1 is supported by a moving mechanism which is not shown, so as to be positioned on the side of the back face of the card conveying path during an erasing operation, and on the side of the front face of the card conveying path during an unerasing operation.

When the magnetic display sheet 3 is to be erased, the erasing head 1 is positioned so that the erasing face thereof opposes the card conveying path. When the magnetic card 4 is moved in the proximity of the erasing head 1, the visible information recorded on the magnetic display sheet 3 is erased by the parallel magnetic fields produced by the permanent magnets 2a to 2d.

Next, the case where the magnetic display sheet 3 is not to be erased will be described. The erasing head 1 is moved upward and then positioned so that the bottom face of the erasing head 1 opposes the card conveying path, thereby attaining a posture in which the erasing face is most remote from the conveying path. As a result, magnetic force emitted from the erasing face cannot reach the conveying path. Particularly, the existence of the magnetic shield 5 largely attenuates the magnetic field to an extent that the magnetic field at the position where the magnetic display sheet 3 passes does not produce a problem from a practical view point.

In this way, the use of the magnetic shield can shorten the moving distance of the erasing head 1, with the result that the apparatus can be miniaturized and the degree of freedom of the design is increased.

Figures 7A, 7B, 7C:
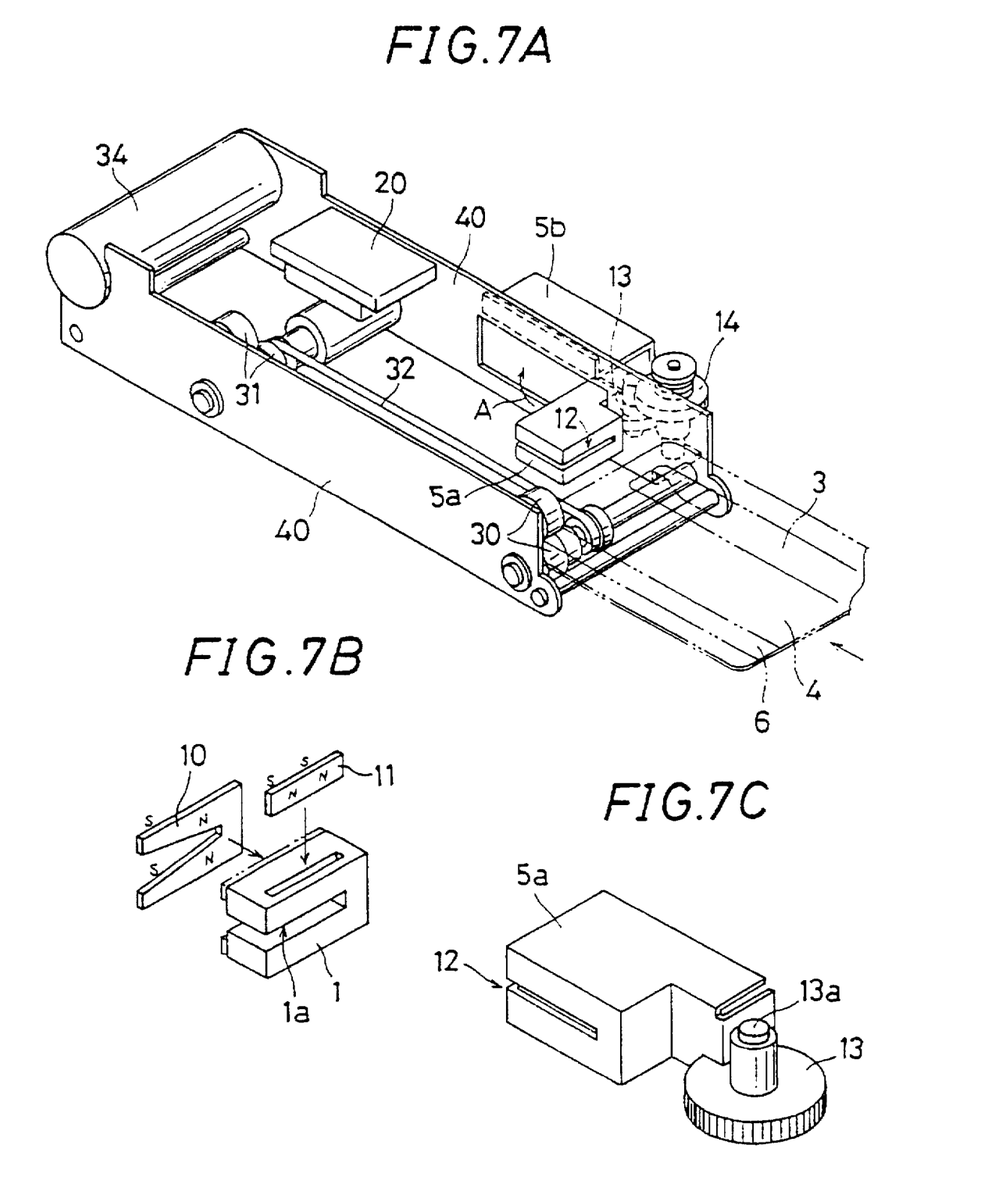
FIG. 7A is a perspective view showing the whole of the embodiment.
FIG. 7B is an exploded perspective view of an erasing head.
FIG. 7C is a perspective view showing a rotation mechanism of the erasing head.
Figure 8:
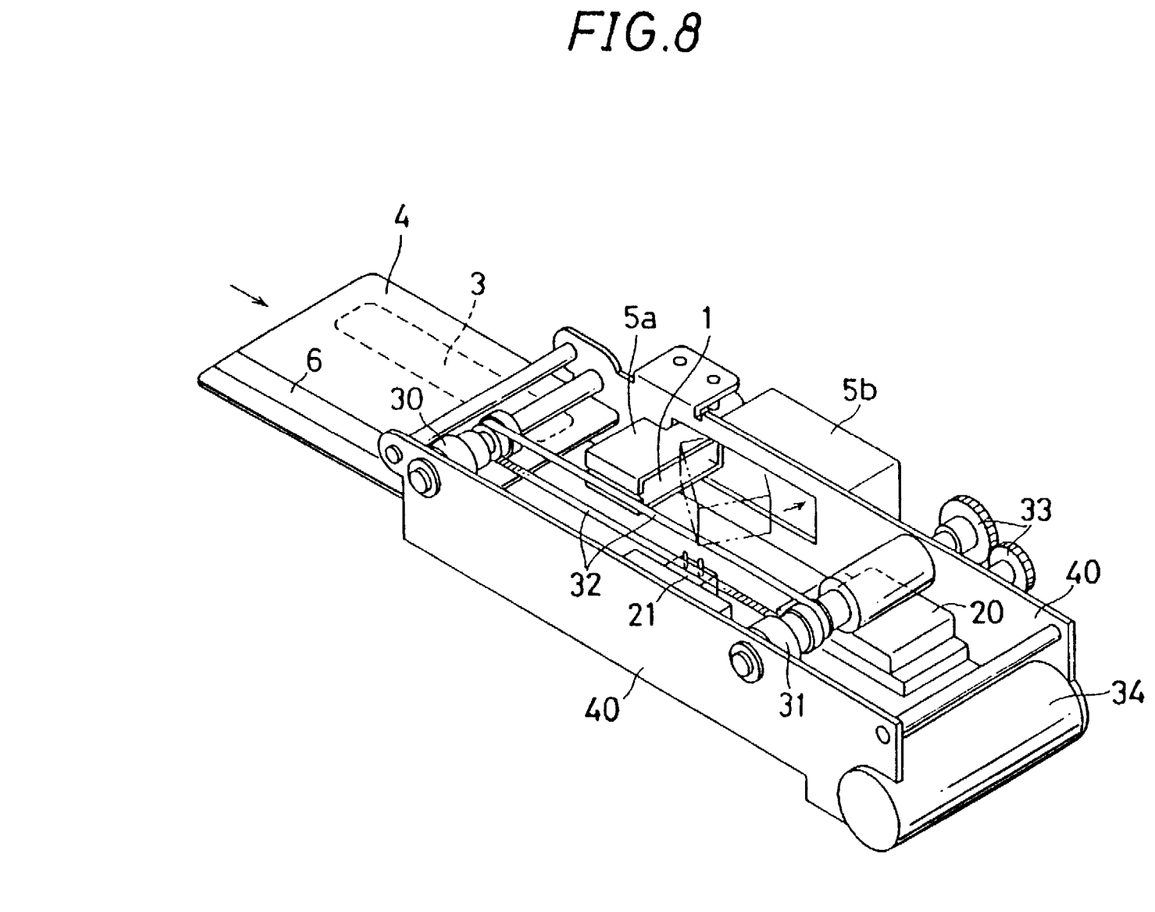
FIG. 8 shows the seventh embodiment of the invention and is a perspective view showing the whole of the seventh embodiment as seen from the back side in the assumption that FIGS. 7A to 7C are a view as seen from the front side.

FIGS. 7A to 7C show a seventh embodiment of the invention. FIG. 7A is a perspective view showing the whole of the embodiment. FIG. 7B is an exploded perspective view of an erasing head, and FIG. 7C is a perspective view showing a rotation mechanism for the erasing head. FIG. 8 is a perspective view showing main portions of the whole of the embodiment as seen from the back side. The magnetic card 4 is configured in the same manner as that shown in FIG. 1 and hence duplication of description is omitted.

In the erasing head 1, as shown in FIG. 7b, a flat permanent magnet 10 in which a V-groove is formed is attached by an adhesive to one end face of a holder which has a slit 1a and which is formed into a U-like shape. The holder is made of plastic or the like. A rectangular permanent magnet 11 is embedded into the holder. The permanent magnets 10 and 11 are disposed in such a manner that the N- and S-poles are aligned in the card conveying direction. In the vicinity of the slit 1a, the permanent magnet 11 produces a magnetic field which is substantially perpendicular to the card conveying direction, and the permanent magnet 10 produces a magnetic field which is substantially parallel to the card conveying direction.

As shown in FIG. 7C, the thus configured erasing head 1 is fixed to the magnetic shield 5a which has a shape configured by three faces of a rectangular parallelopiped shape and in which a slit 12 is formed so as to coincide with the slit 1a. A partial gear 13 having a support shaft 13a is integrally attached to the magnetic shield 5a.

As shown in FIGS. 7A and 8, conveying rollers 30 and 31, etc. are attached to a pair of chassis 40 so as to function as a card conveying mechanism. The conveying rollers 30 and 31 are connected to each other by an endless belt 32. The one conveying roller 31 is driven by a motor 34 via a gear train 33.

The erasing head 1 is rotatably attached to one of the chassis 40. The partial gear 13 of the erasing head 1 meshes with a drive gear 14 which is driven by a motor or the like (not shown). The erasing head 1 can be angularly displaced about the support shaft 13a of the partial gear 13. In the chassis 40, the magnetic shield 5b defines a space for housing the erasing head 1.

On the downstream side along the card conveying direction, a recording head 20 in which many electromagnetic coils for producing a spot-like magnetic field are formed is disposed so as to magnetically print visible information on the magnetic display sheet 3 of the magnetic card 4. On the other hand, a recording head 21 which records invisible information is disposed at a position corresponding to the magnetic stripe 6 of the magnetic card 4.

When the magnetic display sheet 3 is to be erased, the erasing head 1 is angularly displaced about the support shaft 13a of the partial gear 13 and protrudes into the conveying path. Then, the erasing head 1 is positioned so that the conveyed magnetic card 4 passes through the slits 12 and 1a. When the conveyed magnetic card 4 passes through the slit 12 of the erasing head 1 under this state, black is once written into the whole of the magnetic display sheet 3 by the perpendicular magnetic field of the permanent magnet 11 of the erasing head 1. Thereafter, the visible information recorded on the magnetic display sheet 3 is erased by the parallel magnetic field of the permanent magnet 10 of the erasing head 1.

Next, the case where the magnetic display sheet 3 is not to be erased will be described. The erasing head 1 is angularly displaced in the direction of the arrow A, namely, in the direction parallel to the card conveying plane, so as to be retracted from the card conveying path and then housed in the magnetic shield 5b attached to the chassis 40. Under this state, the magnetic shields 5a and 5b are magnetically joined together so as to interrupt the magnetic field produced by the erasing head 1. As a result, the magnetic fields produced by the permanent magnets 10 and 11 cannot reach the conveying path, and the magnetic fields are largely attenuated to an extent that the magnetic fields at the position where the magnetic display sheet 3 passes do not produce a problem from a practical view point.

In this way, the use of the magnetic shield can shorten the moving distance of the erasing head 1, with the result that the apparatus can be miniaturized and the degree of freedom of the design is increased.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A magnetic display erasing apparatus comprising:
   an erasing head for producing an erasing magnetic field to erase visible information written into a magnetic display medium which is conveyed relative to said erasing head during an erasing operation; and
   a magnetic shield for selectively weakening the erasing magnetic field produced by said erasing head to an extent that the visible information of the magnetic display medium is not affected by the erasing magnetic field during a non-erasing operation.

2. The magnetic display erasing apparatus of claim 1, wherein said magnetic shield can house said erasing head in order to shield the magnetic display medium from the erasing magnetic field.

3. The magnetic display erasing apparatus of claim 1, further comprising moving means for moving at least one of said erasing head and said magnetic shield in order to control a shielding effect.

4. The magnetic display erasing apparatus of claim 2 further comprising moving means for moving at least one of said erasing head and said magnetic shield in order to control a shielding effect.

5. The magnetic display erasing apparatus of claim 1, wherein a part or the whole of said magnetic shield is attached to said erasing head.

6. The magnetic display erasing apparatus of claim 2, wherein a part or the whole of said magnetic shield is attached to said erasing head.

7. The magnetic display erasing apparatus of claim 1, wherein said erasing head comprises a portion which produces the magnetic field and another portion where said magnetic shield is disposed, and one of the portions selectively opposes the magnetic display medium, when the medium is conveyed relative to said erasing head, by inversion or movement of said erasing head in order to control a shielding effect.

8. The magnetic display erasing apparatus of claim 2, wherein said erasing head comprises a portion which produces the magnetic field and another portion where said magnetic shield is disposed, and one of the portions selectively opposes the magnetic display medium, when the medium is conveyed relative to said erasing head, by inversion or movement of said erasing head in order to control a shielding effect.

9. The magnetic display erasing apparatus of claim 3, wherein said erasing head comprises a portion which produces the magnetic field and another portion where said magnetic shield is disposed, and one of the portions selectively opposes the magnetic display medium, when the medium is conveyed relative to said erasing head, by inversion or movement of said erasing head in order to control a shielding effect.

10. The magnetic display erasing apparatus of claim 4, wherein said erasing head comprises a portion which produces the magnetic field and another portion where said magnetic shield is disposed, and one of the portions selectively opposes the magnetic display medium, when the medium is conveyed relative to said erasing head, by inversion or movement of said erasing head in order to control a shielding effect.

11. The magnetic display erasing apparatus of claim 3, wherein a movement direction of said erasing head or said magnetic shield is parallel to a magnetic display medium conveying plane.

12. A magnetic display erasing apparatus comprising:
    an erasing head for producing an erasing magnetic field to erase visible information written into a magnetic display medium which is conveyed relative to said erasing head during an erasing operation;
    wherein said erasing head is retracted in a direction parallel to a magnetic display medium conveying plane during a non-erasing operation.

13. A magnetic display erasing apparatus as set forth in claim 1, further comprising a chassis, wherein said erasing head and said magnetic shield are mounted on said chassis.

14. A magnetic display erasing apparatus as set forth in claim 13, wherein said erasing head is movably mounted on said chassis.

15. A magnetic display erasing apparatus as set forth in claim 13, wherein said magnetic shield is movably mounted on said chassis.

16. A magnetic display erasing apparatus as set forth in claim 1 further comprising a chassis and a medium conveying mechanism having a medium conveying path, wherein said medium conveying mechanism is provided on said chassis and said erasing head and said magnetic shield are mounted on said chassis.

17. A magnetic display erasing apparatus as set forth in claim 16, wherein said erasing head is movably mounted on said chassis and said erasing head is moveable relative to said medium conveying path.

18. A magnetic display erasing apparatus as set forth in claim 16, wherein said magnetic shield is movably mounted on said chassis and said magnetic shield is moveable relative to said medium conveying path.

\* \* \* \* \*